O. S. PULLIAM.
TRANSMISSION.
APPLICATION FILED APR. 23, 1920.
1,371,187.
Patented Mar. 8, 1921.
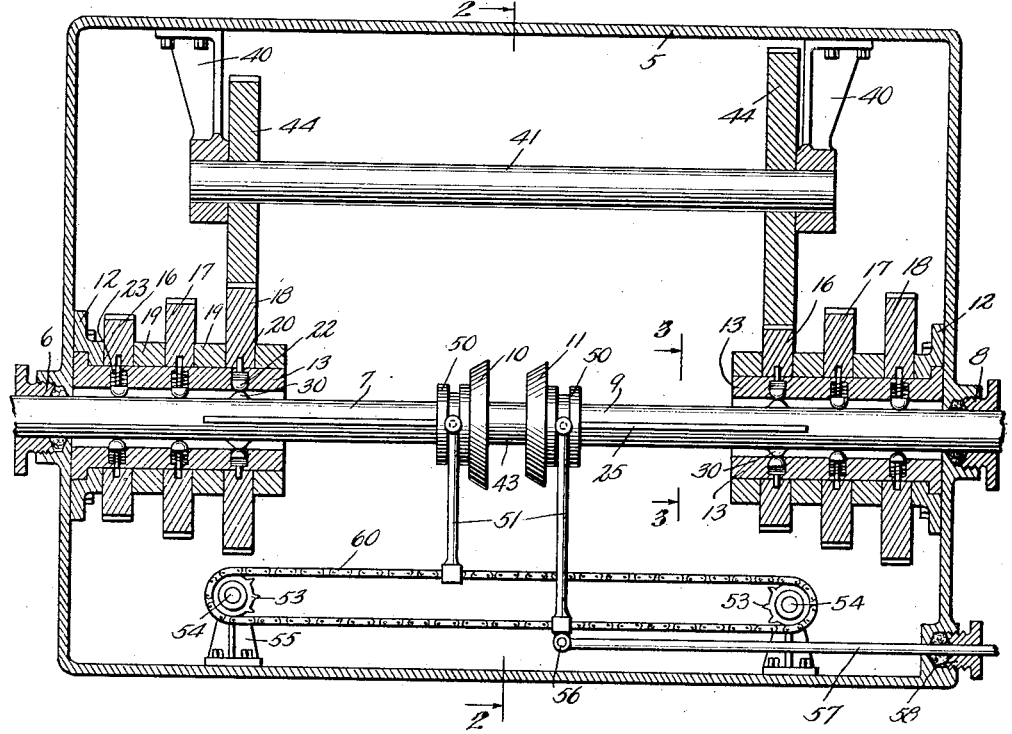
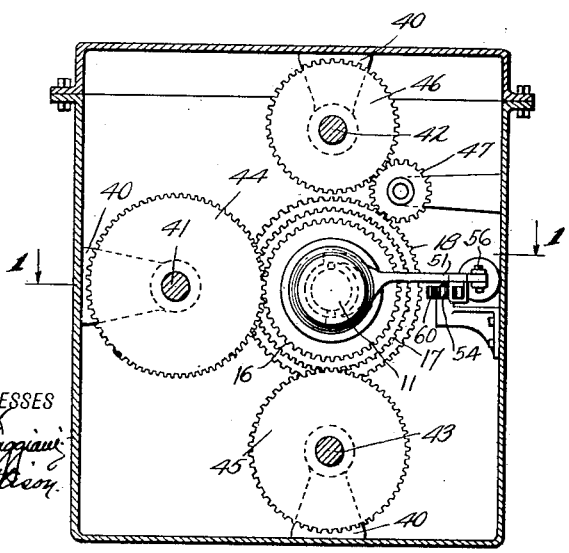
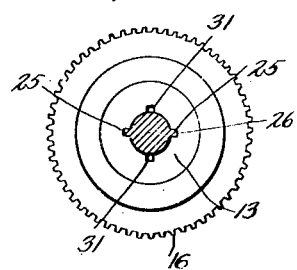
INVENTOR
O. S. Pulliam,
BY
ATTORNEYS

UNITED STATES PATENT OFFICE.

OSWALD S. PULLIAM, OF NEW YORK, N. Y.

TRANSMISSION.

1,371,187.  Specification of Letters Patent.  Patented Mar. 8, 1921.

Application filed April 23, 1920. Serial No. 376,012.

*To all whom it may concern:*

Be it known that I, OSWALD S. PULLIAM, a citizen of the United States, and a resident of the city of New York, borough of Manhattan, in the county and State of New York, have invented a new and Improved Transmission, of which the following is a full, clear, and exact description.

The present invention relates to new and useful improvements in gear sets or transmission mechanisms, and it pertains more particularly to a gear set especially adapted for the transmission of power in motor vehicles.

It is one of the objects of the present invention to provide a new and improved mechanism in which a direct connection is established between the driving and the driven members when it is desired to transmit the power at high speed.

It is a further object of the invention to provide a novel mechanism in which the direct connection between the driving and the driven members may be broken when it is desired to drive at low speeds or in a reverse direction.

It is a further object of the present invention to so construct such a mechanism that the simultaneous movement of the driving and the driven members to break the direct connection will subsequently operate to lock the several gears of the change-speed mechanism in order that variations in the speeds of the driven member may be had.

With the above and other objects in view, reference is had to the accompanying drawings, in which—

Figure 1 is a horizontal sectional view of a gear set constructed in accordance with the present invention:

Fig. 2 is a vertical sectional view taken on the line 2—2 of Fig. 1;

Fig. 3 is a detail sectional view taken on the line 3—3 of Fig. 1.

Referring more particularly to the drawings, the reference character 5 designates the gear housing or box, and extending through one end thereof and rotatably mounted in a bearing or stuffing box 6, is a driving shaft 7. Passing through the other end of the gear box 5, preferably in direct alinement to the driving shaft 7, and mounted in a bearing or stuffing box 8, is a driven shaft 9. The driving shaft 7 and the driven shaft 9 are provided with clutch faces 10 and 11, respectively, and said clutch faces are adapted for interengagement with each other to provide a direct driving connection between the driving shaft 7 and the driven shaft 9.

Mounted on each end wall of the gear box 5 by means of a bearing or bracket 12, is a sleeve 13, and said sleeves 13 are adapted to inclose their respective driving or driven member, as the case may be. Mounted for rotation upon each of the sleeves 13, is a plurality of gears 16, 17 and 18, and these gears are maintained in spaced relation and in proper position on their respective sleeves, by means of washers or other suitable spacing elements 19. Each of these gears is provided with radially disposed openings 20 in that portion of the gear which has sliding or movable contact with its respective sleeve 13, and carried by the sleeves 13 at diametrically opposite points are pawls 22 adapted to be forced into engagement with the radial openings 20 of the gears to lock the gears to their respective sleeves in order that they may turn therewith. Each of the pawls 22 is spring pressed in order to maintain it in its extended position, a coil spring 23 being preferably employed for this purpose.

The driving member 7 and the driven member 9 are each provided with longitudinally extending keys 25, and said keys are diametrically opposed with respect to the member on which they are carried. These keys 25 are adapted to slide in grooves 26 in the sleeves 13, and through the means by which the sleeves are rotated, with their respective shafts. The driving member or shaft 7 and the driven member or shaft 9 are each further provided at diametrically opposite points, with lugs or projections 30, and these lugs or projections 30 are adapted to slide in grooves 31 at diametrically opposite points in their respective sleeves 13, and it is within these grooves 31 that the pawls 22 heretofore mentioned, lie. By this construction, it will be seen that as the driving member 7 is moved longitudinally of its sleeve 13, the lugs 30 will successively engage the pawls 22 and lock their gears to their respective sleeves 13. This operation is also true of the driven member 9 as it is moved longitudinally of its sleeve 13, to lock the gears carried thereby in such a manner as to cause them to rotate with the sleeve.

Mounted in brackets carried by the side walls of the gear box are countershafts 41, 42 and 43. The countershaft 41 is provided near each of its ends with a gear 44, and one of said gears 44 is adapted to mesh with the gear 18 on the driving end of the gear box, the other gear 44 meshing with the gear 16 on the driven end of the gear box. The countershaft 43 is directly below the driving member 7 and the driven member 9 in Fig. 1, and it is provided on each of its ends with a gear 45, but one gear being seen in Fig. 2. These gears 45 mesh with the gear 17 on the driving end and the gear 17 on the driven end. Mounted on the rear end of the countershaft 42 is a gear 46, and said gear 46 meshes with a gear 47, which in turn meshes with a gear 18 at the driven end of the gear box 5.

By means of the intermediate gear 47, a drive in the reverse direction is imparted to the driven shaft 9, it being understood that a gear upon the forward end of the countershaft 42 meshes with the gear 16 at the driving end of the gear box.

From the foregoing it will be seen that as the driving member 7 and the driven member 9 are moved in opposite directions, the gears of the change-speed gearing which are carried by the driving and the driven members are successively locked to their respective sleeves in order that the speed of the power transmitted from the driven end of the gear box may be reduced or reversed, depending upon the extent of movement of the driving and the driven members in opposite directions. Upon movement of the driving and the driven members toward each other, however, all of the gears are thrown out of operative connection with their respective driving or driven members and a direct drive through the gear box is obtained, the sleeves 13 rotating freely within the gears and their spacing elements.

To provide for the movement of the driving and the driven members in opposite directions, each of said members is provided with a grooved collar 50, and mounted in the grooved collar are levers 51. Each of these levers is connected to a chain 60 and said chain passes around sprocket wheels 53 mounted on shafts 54 carried by brackets 55 secured to one of the walls of the gear box. One of the levers 51 is extended as at 56, and is connected to a rod 57, which latter is adapted to be operated by the gear shift lever suitably mounted at any point remote from the gear box. By this construction, it will be seen that as the lever 57 is reciprocated in its bearing 58, the driving member 7 and the driven member 9 will be moved in opposite directions toward or away from each other in order to make or break the direct connection therebetween.

Having thus described the invention, what is claimed is:

1. A driving element and a driven element adapted for engagement with each other to provide a direct driving connection, a speed-changing mechanism, and means for moving said driving and driven members in opposite directions to break said direct driving connection and operatively engage the elements of the speed-changing mechanism.

2. A driving element and a driven element adapted to be moved in opposite directions for engagement with each other to provide a direct driving connection and moved in opposite directions from each other out of engagement to break said direct driving connection, and a speed-changing mechanism, the elements of which vary the speed of the driven element relative to the speed of the driving element upon movement of the two elements in opposite directions to break the direct driving connection.

3. A mechanism for transmitting power comprising a driving element and a driven element, means for relatively moving the driving element and the driven element to operatively connect said elements for direct driving, a speed-changing mechanism associated with said driving element and said driven element, and means for automatically connecting the driven element with the driving element through the speed-changing mechanism upon relative movement of the driving and driven elements to disconnect the one from the other.

4. In a speed-changing mechanism, a driving element and a driven element adapted for relative movement in opposite directions to operatively connect and disconnect said driving and driven elements for direct driving, a speed-changing mechanism associated with the driving and the driven elements, and means for connecting the driven element with the driving element through the medium of the speed-changing mechanism upon relative movement of the driving and the driven elements.

5. A driving member, a driven member, and a normally inoperative speed-changing mechanism, said driving and driven members being adapted to be moved into engagement with each other to provide a direct driving connection therebetween and movable away from each other to break said direct driving connection and simultaneously engage with the speed-changing mechanism to vary the speed of the driven member.

6. A driving element and a driven element adapted for engagement with each other to provide a direct driving connection, a speed-changing mechanism, and means for moving said driving and driven members out of engagement with each other to break said direct driving connection and operatively engage the elements of the speed-changing mechanism.

7. A driving element and a driven element adapted for engagement with each other to provide a direct driving connection, a speed-changing mechanism, and means for moving said driving and driven elements out of engagement with each other to break the direct driving connection and simultaneously operatively engage the elements of the speed-changing mechanism.

OSWALD S. PULLIAM.